United States Patent

Li et al.

[11] Patent Number: 5,738,566
[45] Date of Patent: Apr. 14, 1998

[54] LAPPING GUIDE SYSTEM, METHOD AND ARTICLE OF MANUFACTURE

[75] Inventors: Zhihao Li, St. Paul, Minn.; Ganesan Doraisami, Westboro, Mass.; Beat G. Keel, Prior Lake, Minn.

[73] Assignee: Seagate Technology, Inc., Scotts Valley, Calif.

[21] Appl. No.: 829,219

[22] Filed: Mar. 31, 1997

[51] Int. Cl.$^6$ .................................................. B24B 1/00
[52] U.S. Cl. .................. 451/28; 451/1; 451/5; 451/9; 451/41; 29/603.1
[58] Field of Search .................. 451/1, 5, 9, 10, 451/11, 28, 41, 603.9, 603.1; 360/119, 123

[56] References Cited

U.S. PATENT DOCUMENTS

| | | | |
|---|---|---|---|
| 3,821,815 | 6/1974 | Abbott et al. | 360/110.2 |
| 4,477,968 | 10/1984 | Kracke et al. | 29/603 |
| 4,511,942 | 4/1985 | Valstyn | 451/28 |
| 4,675,986 | 6/1987 | Yen | 29/603 |
| 4,681,398 | 7/1987 | Fukuoka et al. | 451/1 |
| 4,689,877 | 9/1987 | Church | 29/603 |
| 4,739,562 | 4/1988 | Kracke et al. | 33/567 |
| 5,023,991 | 6/1991 | Smith | 29/603 |
| 5,065,483 | 11/1991 | Zammit | 451/1 |
| 5,175,938 | 1/1993 | Smith | 33/567 |
| 5,463,805 | 11/1995 | Mowry et al. | 451/1 |
| 5,494,473 | 2/1996 | Dupuis et al. | 451/1 |
| 5,597,340 | 1/1997 | Church et al. | 451/5 |

*Primary Examiner*—Robert A. Rose
*Assistant Examiner*—George Nguyen
*Attorney, Agent, or Firm*—Kinney & Lange, P.A.

[57] ABSTRACT

A lapping guide system, method and article of manufacture is disclosed. A method of fabricating a lapping guide for use in conjunction with the machining of a magnetic recording transducer includes the following steps. A plurality of lap switch fingers of the lapping guide and a bottom pole of the transducer are fabricated at the same time and from the same material. Each lap switch finger has the same topology as the topology of the bottom pole. An insulating layer is fabricated on the plurality of lap switch fingers of the lapping guide and on the bottom pole of the transducer. A top conductor is fabricated on the insulating layer above a plurality of lap switch fingers, while a top pole is fabricated on the insulating layer above the bottom pole. The top conductor and top pole are fabricated at the same time and from the same material.

24 Claims, 3 Drawing Sheets

LAPPING GUIDE SYSTEM, METHOD AND ARTICLE OF MANUFACTURE

BACKGROUND OF THE INVENTION

The present invention relates generally to fabricating an accurate magnetic recording transducer. More particularly, the present invention relates to a lapping guide for use in machining a magnetic recording transducer.

An electrical lapping guide (ELG) is used in the process of machining magnetic recording transducers to provide an accurate throat height of each transducer. Accuracy in the throat height to within a few micro-inches is desirable to ensure optimum electronic and magnetic performance for a height-efficiency recording transducer. Lapping thin-film magnetic transducers to a required specification with very tight tolerances has always been a difficult problem because of the extremely small distances and tolerances involved.

During the fabrication of magnetic transducers for use in magnetic data storage applications, an array of transducers and auxiliary circuits are fabricated on a common substrate in a deposition of metallic and non-metallic layers. The auxiliary circuits are sometimes referred to as electronic lapping guides (ELGs). ELGs provide a series of measurements to predict the throat height of the transducer during the machining process.

The ratio of ELGs to transducers can vary depending on the particular application from a 1 to 1 ratio to a 1 to 100 ratio. Patterning of the array of transducers and ELGs is accomplished through use of photolithography in combination with etching and lift-off processes. The finished array or wafer is then optically inspected and/or electrically probed and subsequently cut into smaller arrays, rows or bars. Individual rows or bars of transducers and ELGs are machined at a surface which will eventually face the recorded medium, to obtain a desired throat height of the transducer. The individual row or bar is then diced through the plurality of ELGs, thereby freeing the individual transducers from the bar. Each transducer is then incorporated into a disc drive system.

Inductive ELGs consist of two parts: (1) analog and (2) discrete break switch. Discrete lap switches break at various distances from the original lapping point and thereby provide a series of calibrations to the continuous analog sensor. When fabricating thin-film magnetic heads, the zero transistor throat height is formed by the deposition of an insulating layer followed by multi-layer depositions to form a very complicated magnetic device. However, some differences are necessary for fabricating lap switch sensors (discrete break switches) of the ELG because the discrete lap switches are formed using many of the same process steps that form the transducer, but just have two conductive patterns with an insulating layer positioned between the two conductive patterns.

For a conventional ELG, the lap switch layout of the ELG includes a yolk plate (bottom plate) forming the common bottom connection for each lap switch. An insulating layer is fabricated on top of the yolk plate, while a plurality of lap switch fingers are positioned on top of the insulating layer. Each of the plurality of lap switches opens at various throat heights, indicating the machining process is proceeding correctly.

In most applications, the ELG is positioned next to a transducer. The bottom plate (yolk plate) of the ELG is far wider than the lower pole of the transducer. Thus, the insulator formed over the wide bottom yolk plate does not behave like, or track, identical to the insulator formed over the narrow lower pole of the transducer. Wafer fabrication processes further alter the insulator shape over the wide lower yolk plate differently from the way they alter the insulator positioned over the bottom pole of the transducer. This limits the accuracy and reliability of present ELGs.

More specifically, the above-described layout has several disadvantages when the photoresist insulator is deposited to form the zero throat. First, the bottom pole of the transducer has a different topology shape from the yolk plate of the ELG. This different topology will cause the photoresist to have different thickness variation above and around the bottom pole of the transducer as compared to above and around the yolk plate of the ELG.

Secondly, this design does not account for errors introduced by the existence of mask or contact edge movement caused by wafer processing steps to the insulator positioned above the yolk plate of the ELG as compared to the insulator above the bottom pole of the transducer. An offset as large as 20 micro-inches has been recorded with respect to the photoresist edge offset. This dimension offset introduces errors in the machining process which causes the machining process to be halted at an incorrect time, thereby providing an incorrect throat height of the transducer.

Third, the lifted insulator is another common problem found in the conventional lap switch that could potentially effect the throat height of the transducer. This problem is due to the cure of the insulator and post-cure processing. The problem brings in an additional offset from the discrete lap switch edge position relative to the zero throat of the transducer. It is also possible that there may be a lift problem for one discrete lap switch but not for another. This inaccuracy provides for additional problems to control during a lapping process.

Thus, there is a need for an ELG which can be used in conjunction with the machining of a surface of a magnetic recording transducer to a desired throat height.

SUMMARY OF THE INVENTION

A lapping guide system, method and article of manufacture is disclosed. A method of fabricating a lapping guide for use in conjunction with the machining of a magnetic recording transducer includes the following steps. A plurality of lap switch fingers of the lapping guide and a bottom pole of the transducer are fabricated at the same time and from identical materials. An insulating layer is fabricated on the plurality of lap switch fingers of the lapping guide and on the bottom pole of the transducer. A top conductor is fabricated on the insulating layer above the plurality of lap switch fingers, while a top pole is fabricated on the insulating layer above the bottom pole. The top conductor and top pole are fabricated at the same time and from identical materials.

In one preferred embodiment, the plurality of lap switch fingers is fabricated such that each lap switch finger has a height and a width identical to the height and the width of the bottom pole of the transducer. Thus, each lap switch finger behaves and tracks identical to the bottom pole of the transducer.

DETAILED DESCRIPTION OF THE PREFERRED EMBODIMENTS

Figure 1:
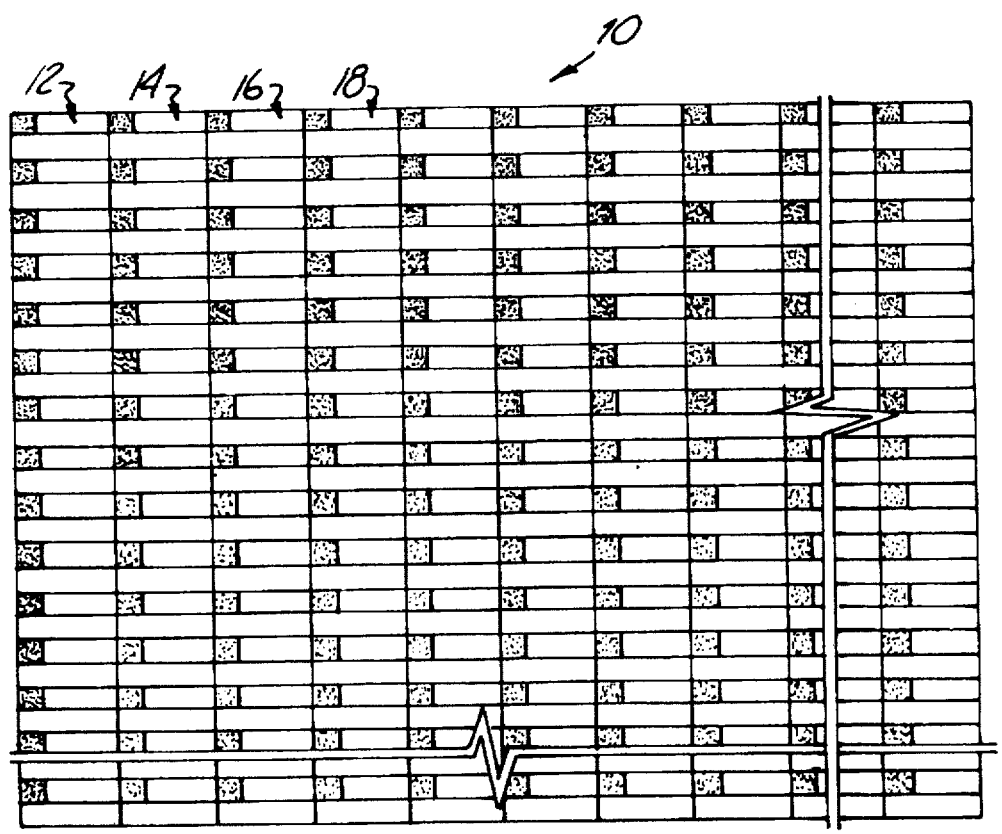
FIG. 1 is a diagrammatical view of a wafer map including several transducers and auxiliary circuits.

The present invention relates to the fabrication of magnetic recording transducers. The fabrication process begins with a wafer map. FIG. 1 is a diagrammatical view of wafer map 10 including several similar transducer die 12, 14, 16 and 18. Wafer map 10 can vary in size from as little as 1 die to as many as 100,000 die or more.

Figure 2:
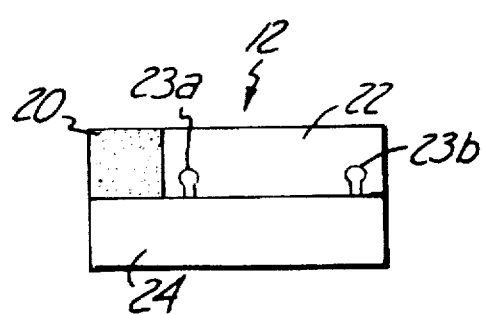
FIG. 2 is a greatly enlarged diagrammatical view of a single transducer die.

FIG. 2 is a greatly enlarged diagrammatical view of transducer die 12. Die 12, as shown in FIG. 2, includes electronic lapping guide (ELG) 20, slider 22, having transducers 23a and 23b, and saw alley 24. ELG 20 is a portion of die 12 which controls the final dimensions of both slider 22 and sensors 23a and 23b. While FIG. 2 displays slider 22 having two transducers, it is understood that slider 22 may have any number of transducers, depending on the particular application.

For a transducer, similar to transducers 23a and 23b, to be fabricated such that it can be incorporated into a slider and precisely detect signals from a storage medium or disc during a read operation, the geometrical dimensions of both slider 22 and transducers 23a and 23b, especially the height of transducers 23a and 23b, must be meticulously precise. In order to accurately develop a plurality of sliders from wafer map 10, wafer map 10 must first be sliced into a plurality of bars or rows.

Figure 3:
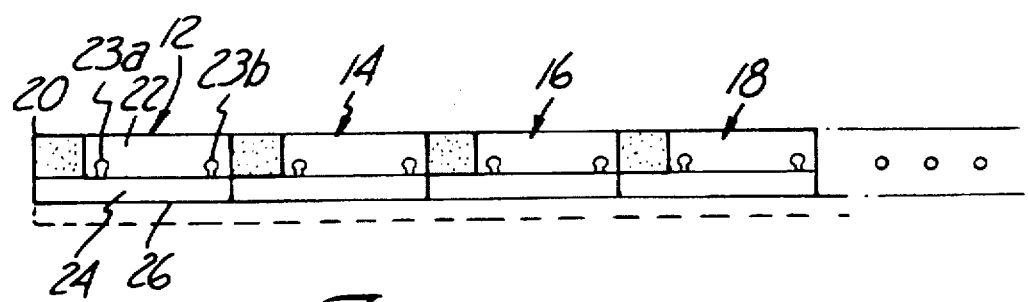
FIG. 3 is a greatly enlarged diagrammatical view of a bar of transducer die prior to be lapped to a final height.

FIG. 3 is a greatly enlarged diagrammatical view showing a single bar of dies 12, 14, 16 and 18 from wafer map 10 after wafer map 10 has been sliced into a plurality of bars. Wafer map 10 is sliced through the numerous saw allies similar to saw alley 24. Die, such as die 12, consists of ELG 20, slider 22 having transducers 23a and 23b, and a thin layer of remaining saw alley 24 having a bottom surface 26.

Figure 4:
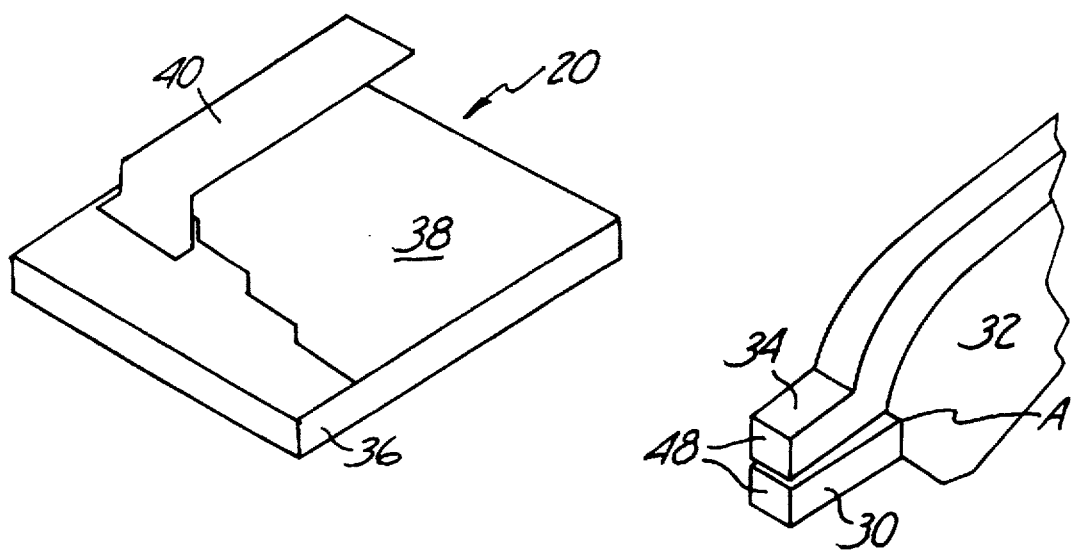
FIG. 4 is a perspective view of a prior art transducer and auxiliary circuit.
Figure 5:
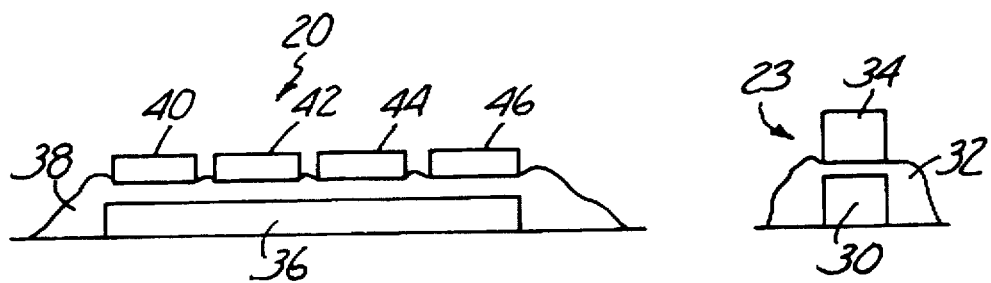
FIG. 5 is an end view of the transducer and auxiliary circuit shown in FIG. 4 as viewed from an air bearing surface.

FIG. 4 is a perspective view of prior art transducer 23 and ELG 20. FIG. 5 is an end view of prior art transducer 23 and ELG 20. As shown in FIGS. 4 and 5, prior art transducer 23 includes bottom pole 30, insulator 32, and top pole 34. Also shown in FIGS. 4 and 5, ELG 20 includes bottom plate (yolk plate) 36, insulator 38, and lap switch fingers 40, 42, 44 and 46.

For a transducer, such as prior art transducer 23, to properly read information from a magnetic storage medium or disc, it is critical that the throat height of transducer 23 is accurately fabricated within required specifications. The throat height is defined as a predetermined distance toward surface 48 calculated from Point A of FIG. 4. During a machining process, transducer 23, along with its corresponding ELG 20, is machined or lapped at surface 48 until ELG 20 indicates that the desired throat height of transducer 23 is achieved. In order for ELG 20 to accurately identify when the desired throat height of transducer 23 has been achieved, ELG 20 must behave like, (i.e. track like) transducer 23.

During a fabrication process in which transducer 23 and ELG 20 are formed, various layers of transducer 23 and ELG 20 are fabricated through use of the same materials at the same time. For example, bottom plate 36 of ELG 20 and bottom pole 30 of transducer 23 are fabricated in the same process step. Likewise, insulators 32 and 38 are fabricated during the same process step. Finally, lap switch fingers 40, 42, 44 and 46 and top pole 34 are fabricated during the same process step. Thus, bottom plate 36 and bottom pole 30 are fabricated from the same material, insulators 32 and 38 are fabricated from the same material and lap switch fingers 40-46 and top pole 34 are fabricated from the same material.

As shown in FIGS. 4 and 5, bottom plate 36 forms a common bottom connection for each of lap switch fingers 40-46. Each of lap switch fingers 40-46 has a width approximately equal to the width of top pole 34 and bottom pole 30. Since bottom plate 36 is one continuous plate, it is clear that bottom plate 36 is much wider than bottom pole 30 of transducer 23. In fact, in prior art designs, bottom plate 30 has a width in the range of 75 to 200 microns, while bottom pole 30 and top pole 34 have a width in the range of 2 to 10 microns. Thus, insulator 38 formed over bottom plate 36 does not behave like, or track, similar to insulator 32 formed over bottom pole 30, even though insulators 32 and 38 are fabricated at the same time and of the same material. Further wafer fabrication processes further alter the insulator shape of insulator 38 over bottom plate 36 differently from the way they alter the insulator shape of insulator 32 fabricated over bottom pole 30. This limits the accuracy and reliability of ELG 20.

More specifically, the prior art prior art design shown in FIGS. 4 and 5 have several disadvantages when depositing a photoresist insulator which forms insulators 32 and 38 because bottom pole 30 of transducer 23 has a different topology shape from bottom plate 36 of ELG 20. This different topology will cause the photoresist to have different thickness variations around bottom pole 30 than on top of bottom plate 36, where the photoresist will be quite uniform. It is a known difficulty to control the throat height of a transducer to an accuracy greater than the zero throat insulation-forming pattern due to photolithography relative to thickness variations. In addition, the prior art design shown in FIGS. 4 and 5 does not account for errors introduced by the existence of mask or contact edge movement developed during wafer processing steps. Photoresist edge offsets as large as 20 microinches have been observed on top of bottom pole 30. This dimensional offset introduces errors in the machining process resulting in a machining process which may be completed at the wrong time. Thus, the transducer will have an inaccurate throat height.

A lifted insulator is another common problem found in the conventional design shown in FIGS. 4 and 5 which could possibly effect the throat height of a transducer or cause the throat height to be off target. This problem has been observed with lap switch bridging problems caused by the insulator lift-off.

Figure 6:
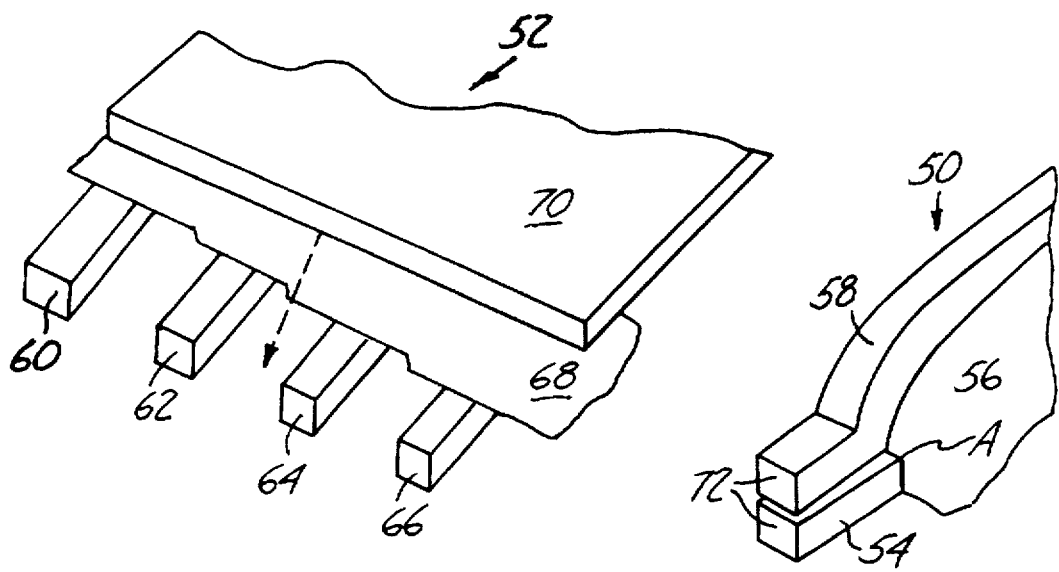
FIG. 6 is a perspective view of a transducer and an auxiliary circuit incorporating the present invention.
Figure 7:
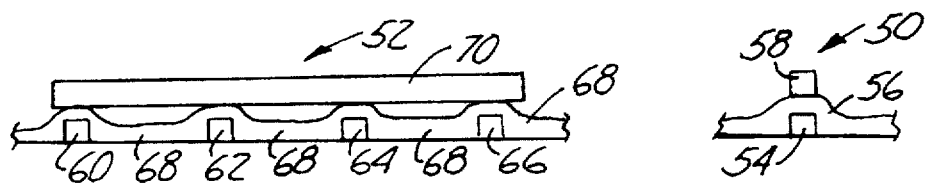
FIG. 7 is an end view of a transducer and an auxiliary circuit incorporating the present invention as viewed from an air bearing surface.

FIG. 6 is a perspective view of transducer 50 and ELG (auxiliary circuit) 52 incorporating the present invention. FIG. 7 is an end view of transducer 50 and ELG 52 incorporating the present invention as viewed from an air beating surface. As shown in FIGS. 6 and 7, transducer 50 includes bottom pole 54, insulator 56 and top pole 58. ELG 52 includes lap switch fingers 60, 62, 64 and 66, insulator 68 and top plate (yolk plate) 70.

The present layout of lap monitor 52 is an inverted version of ELG 20 of the prior art. While creating transducer 50 and ELG 52, lap switch fingers 60-66 are fabricated at the same time and from the same material as bottom pole 54 of transducer 50. Bottom pole 54 is the bottom leg of the transducer flux path. By fabricating lap switch fingers 60–66 at the same time as bottom pole 54, it is ensured that each lap switch finger has the same width and height (film thickness) and topology shape as bottom pole 54 of transducer 50. Insulators 56 and 68 are fabricated at the same time, thus these insulators are identical. Finally, top plate 70 is fabricated at the same time as top pole 58 of transducer 50. Top pole 58 is the top leg of the transducer flux path.

Transducer 50 and ELG 52 can be fabricated through a variety of means and from a variety of materials. In one preferred embodiment, bottom pole 54, top pole 58, lap switch fingers 60–66 and top plate 70 are fabricated by plating permalloy to given specifications. Insulators 56 and 68 are fabricated through use of masking photoresist. By fabricating insulators 56 and 68 through use of photoresist at the same time and over identical objects (bottom pole 54 and lap switch fingers 60–66) ensures that insulators 68 behaves like, i.e. tracks, identical to insulator 56 of transducer 50. For example, during seed layer etching, insulator 50 can be etched away at the same rate and amount as insulator 56. This will reduce the offset between the magnetic zero throat (related to the throat height measured by a scanning electron microscope (SEM)) and the lapping zero throat (measured through use of lap switch fingers 60–66). In addition, the relative edge position is well defined at all times during future processes after the insulator deposition mask. Also, due to the addition contact surface area of the lap switch fingers in the present design, there is a basis for a firm support of the insulator to prevent lift off problems. Thus, all of the disadvantages discussed with respect to the prior art design shown in FIGS. 4 and 5 have been corrected. This leads to improved accuracy and reliability of the throat height of transducer 50, and therefore, of the reading capabilities of transducer 50.

The entire method of fabricating transducer 50 and ELG 52 will now be described. It must be remembered that the purpose of this fabrication process is to ensure that transducer 50 has an accurate throat height as defined as a predetermined distance toward surface 72 calculated from Point A of FIG. 6. This accurate throat height will ensure that transducer 50 will properly read information from a magnetic storage medium or disc.

First, lap switch fingers 60–66 of ELG 52 and bottom pole 54 of transducer 50 are fabricated. In one preferred embodiment, lap switch fingers 60–66 and bottom pole 54 are fabricated by plating permalloy to a desired height and width. Lap switch fingers 60–66 and bottom pole 54 will have a height in the range of 1 to 5 microns and a width in the range of 2 to 10 microns. In addition, lap switch fingers 60–66 are space apart from each other in the range of 10 to 20 microns. Therefore, each lap switch finger of lap switch fingers 60–66 will have an identical topology as that of the topology of bottom pole 54. Next, insulator 56 and 68 are fabricated onto bottom pole 54 and lap switch fingers 60–66, respectively. As shown in FIG. 7, lap switch fingers 60–66 are positioned at such a distance from one another that insulator 68 has an identical topology as that of insulator 56. Thus, insulator 68 will behave like, i.e., track, identical to insulator 56. Top pole 58 and top plate 70 are then fabricated on top of insulators 56 and 68, respectively. Thus, transducer 50 has been fabricated at the same time that ELG 52 has been fabricated. ELG 52 will provide accurate calculations for use in the machining of transducer 50 until an accurate throat height of transducer 50 is accomplished. Other processing steps are then completed to accurately form transducer 50.

As discussed earlier, numerous transducers and ELGs are fabricated in a wafer map, similar to wafer map 10 shown in FIG. 1. Wafer map 10 is sliced into a plurality of bars through the numerous saw allies similar to saw alley 24. The machining or lapping of a single bar is then machined or lapped until an ELG similar to ELG 52 indicates that the desired throat height of transducer 50 has been reached. During the lapping process, both transducer 50 and ELG 52 are lapped from surface 72 towards position A of transducer 50 shown in FIG. 6.

Lap switch fingers 60–66 act as a switch and provide a series of discrete indicators to assist in locating the desired throat height of transducer 50. Each lap switch finger is "closed" until the finger is lapped to where insulator 68 separates lap switch finger 66 from top plate 70. The lap switch finger is then considered "open." Each lap switch finger will "open" at various known distances from the desired throat height of transducer 50. For example, lap switch fingers 60–66 could open at 200–400 microinches, 150–300 microinches, 100–150 microinches and 40–100 microinches from the desired throat height of transducer 50 respectively. These discrete readings assist in determining an accurate throat height. In most preferred embodiments, a desired throat height will be in the range of 40–100 microinches.

Once ELG 52 indicates that the desired throat height of transducer 50 has been accomplished, the machining or lapping process is halted. Finally, the sliders fabricated in a single bar are separated from one another by slicing the bar through the multiple ELG. The remaining sliders can then be incorporated into the desired head design.

Although the present invention has been described with reference to preferred embodiments, workers skilled in the art will recognize that changes may be made in form and detail without departing from the spirit and scope of the invention.

What is claimed is:

1. A method of fabricating a lapping guide for use in machining of a magnetic recording transducer, the method comprising:

fabricating a plurality of lap switch fingers of the lapping guide and a bottom pole of the transducer;

fabricating an insulating layer on the plurality of lap switch fingers of the lapping guide and on the bottom pole of the transducer;

fabricating a top conductor on the insulating layer above the plurality of lap switch fingers and a top pole on the insulating layer above the bottom pole.

2. The method of claim 1 wherein the step of fabricating a plurality of lap switch fingers further comprises:

plating permalloy to form the plurality of lap switch fingers of the lapping guide and the bottom pole of the transducer.

3. The method of claim 1 wherein the step of fabricating a top conductor further comprises:

plating permalloy to form the top conductor on the insulating layer above the plurality of lap switch fingers and plating permalloy to form the top pole on the insulating layer above the bottom pole.

4. The method of claim 1 wherein the step of fabricating an insulating layer further comprises:

fabricating an insulating layer formed from photoresist on the plurality of lap switch fingers of the lapping guide and on the bottom pole of the transducer.

5. The method of claim 1 wherein the step of fabricating a plurality of lap switch fingers further comprises:

fabricating a plurality of lap switch fingers of the lapping guide such that each finger of the plurality of lap switch fingers has a height and a width substantially equal to a height and a width of the bottom pole.

6. The method of claim 5 wherein the step of fabricating a plurality of lap switch fingers further comprises:

fabricating a plurality of lap switch fingers of the lapping guide having a width in the range of 2 to 10 microns; and fabricating the bottom pole of the transducer having a width in the range of 2 to 10 microns.

7. The method of claim 5 wherein the step of fabricating a plurality of lap switch fingers further comprises:

fabricating a plurality of lap switch fingers having a height in the range of 1 to 5 microns; and fabricating the bottom pole of the transducer having a height in the range of 1 to 5 microns.

8. The method of claim 1 wherein the step of fabricating a plurality of lap switch fingers further comprises:

fabricating a plurality of lap switch fingers of the lapping guide such that there is a space in the range of 10 to 20 microns between each of the plurality of lap switch fingers.

9. An apparatus for machining a surface of a magnetic recording transducer to a desired throat height, the apparatus comprising:

a plurality of lap switch fingers positioned adjacent to a bottom pole of the transducer;

an insulating layer positioned on the plurality of lap switch fingers and on the bottom pole of the transducer; and a top conductor positioned on the insulating layer above the plurality of lap switch fingers, the top conductor positioned adjacent a top pole of the transducer.

10. The apparatus of claim 9 wherein the plurality of lap switch fingers is formed from plated permalloy and wherein the bottom pole is fabricated from plated permalloy.

11. The apparatus of claim 9 wherein the top conductor is formed from plated permalloy and wherein the top pole is formed from plated permalloy.

12. The apparatus of claim 9 wherein the insulating layer is formed from photoresist.

13. The apparatus of claim 9 wherein each finger of the plurality of lap switch fingers has a height and a width substantially equal to a height and a width of the bottom pole.

14. The apparatus of claim 9 wherein each finger of the plurality of lap switch fingers has a width in the range of 2 to 10 microns and wherein the bottom pole of the transducer has a width in the range of 2 to 10 microns.

15. The apparatus of claim 9 wherein each finger of the plurality of lap switch fingers has a height in the range of 1 to 5 microns and the bottom pole of the transducer has a height in the range of 1 to 5 microns.

16. The apparatus of claim 9 wherein each finger of the plurality of lap switch fingers is positioned in the range of 10 to 20 microns from any other finger of the plurality of lap switch fingers.

17. A method of machining a magnetic transducer to a desired throat height, the method comprising:

fabricating a plurality of lap switch fingers of a lapping guide and a bottom pole of the transducer, wherein each finger of the plurality of fingers has a height and a width substantially identical to a height and a weight of the bottom pole;

fabricating an insulating layer on the plurality of lap switch fingers and on the bottom pole;

fabricating a top conductor of the lapping guide on the insulating layer above the plurality of lap switch fingers and a top pole of the transducer on the insulating layer above the bottom pole of the transducer; and machining the lapping guide and transducer until the lapping guide indicates that the desired throat height of the transducer has been reached.

18. The method of claim 17 wherein the step of fabricating a plurality of lap switch fingers further comprises:

plating permalloy to form the plurality of lap switch fingers of the lapping guide and the bottom pole of the transducer.

19. The method of claim 17 wherein the step of fabricating a top conductor further comprises:

plating permalloy to form the top conductor on the insulating layer above the plurality of lap switch fingers and plating permalloy to form the top pole on the insulating layer above the bottom pole.

20. The method of claim 17 wherein the step of fabricating an insulating layer further comprises:

fabricating an insulating layer formed from photoresist on the plurality of lap switch fingers of the lapping guide and on the bottom pole of the transducer.

21. The method of claim 17 wherein the step of fabricating a plurality of lap switch fingers further comprises:

fabricating a plurality of lap switch fingers of the lapping guide such that each finger of the plurality of lap switch fingers has a height and a width substantially equal to a height and a width of the bottom pole.

22. The method of claim 17 wherein the step of fabricating a plurality of lap switch fingers further comprises:

fabricating a plurality of lap switch fingers of the lapping guide having a width in the range of 2 to 10 microns; and fabricating the bottom pole of the transducer having a width in the range of 2 to 10 microns.

23. The method of claim 17 wherein the step of fabricating a plurality of lap switch fingers further comprises:

fabricating a plurality of lap switch fingers having a height in the range of 1 to 5 microns; and fabricating the bottom pole of the transducer having a height in the range of 1 to 5 microns.

24. The method of claim 17 wherein the step of fabricating a plurality of lap switch fingers further comprises:

fabricating a plurality of lap switch fingers of the lapping guide such that there is a space in the range of 10 to 20 microns between each of the plurality of lap switch fingers.

\* \* \* \* \*

UNITED STATES PATENT AND TRADEMARK OFFICE
CERTIFICATE OF CORRECTION

PATENT NO. : 5,738,566
DATED : APRIL 14, 1998
INVENTOR(S) : ZHIHAO LI ET AL.

It is certified that error appears in the above-identified patent and that said Letters Patent is hereby corrected as shown below:

Col. 4, Line 60, delete "beating", insert --bearing--

Signed and Sealed this

Fifteenth Day of June, 1999

Attest:

Q. TODD DICKINSON

*Attesting Officer*  *Acting Commissioner of Patents and Trademarks*